(12) United States Patent
Bianchi

(10) Patent No.: US 6,276,260 B1
(45) Date of Patent: Aug. 21, 2001

(54) CONNECTING-ROD/PISTON UNIT FOR SMALL RECIPROCATING MACHINES AND A MOTOR-DRIVEN COMPRESSOR OR A SIMILAR RECIPROCATING MACHINE COMPRISING THE UNIT

(75) Inventor: Vittorio Bianchi, Ferrera Di Varese (IT)

(73) Assignee: Embraco Europe S.r.L., Turin (IT)

( * ) Notice: Subject to any disclaimer, the term of this patent is extended or adjusted under 35 U.S.C. 154(b) by 0 days.

(21) Appl. No.: 09/402,247
(22) PCT Filed: Mar. 26, 1998
(86) PCT No.: PCT/EP98/01801
§ 371 Date: Dec. 2, 1999
§ 102(e) Date: Dec. 2, 1999
(87) PCT Pub. No.: WO98/44280
PCT Pub. Date: Oct. 8, 1998

(30) Foreign Application Priority Data

Apr. 2, 1997 (IT) .............................................. TO97A0278

(51) Int. Cl.[7] ...................................................... F16J 1/14
(52) U.S. Cl. ............................................... 92/187; 92/216
(58) Field of Search .................. 92/187, 216; 123/193.1, 123/193.6, 193.4

(56) References Cited

U.S. PATENT DOCUMENTS 5,072,654 * 12/1991 MacGregor ............................ 92/157
5,092,290 3/1992 Bartkowicz ........................ 123/193.6

FOREIGN PATENT DOCUMENTS 0-608-506 8/1994 (EP) .
2-330-923 6/1977 (FR) .

* cited by examiner

Primary Examiner—F. Daniel Lopez
Assistant Examiner—Thomas E. Lazo
(74) Attorney, Agent, or Firm—Sughrue, Mion, Zinn Macpeak & Seas, PLLC

(57) ABSTRACT

A gudgeon pin (14) is held in engagement with a bearing seat situated inside a piston (16) by retaining means in the form of a pincer element (30) with a base portion (32) fixed to the end wall (20) of the piston (16) and with two pairs of resilient jaws (38) arranged on either side of the small end (12) of the connecting rod (10) and shaped so as to grasp the gudgeon pin (14) and hold it in the scat by a snap-coupling.

6 Claims, 4 Drawing Sheets

Figure 3:
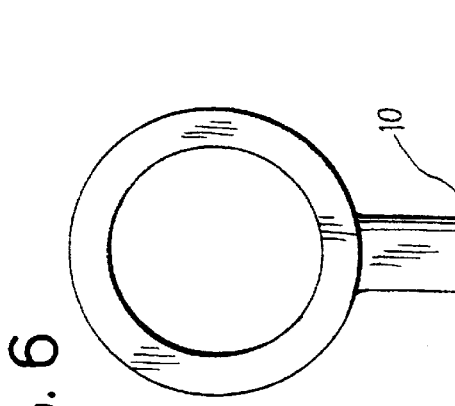

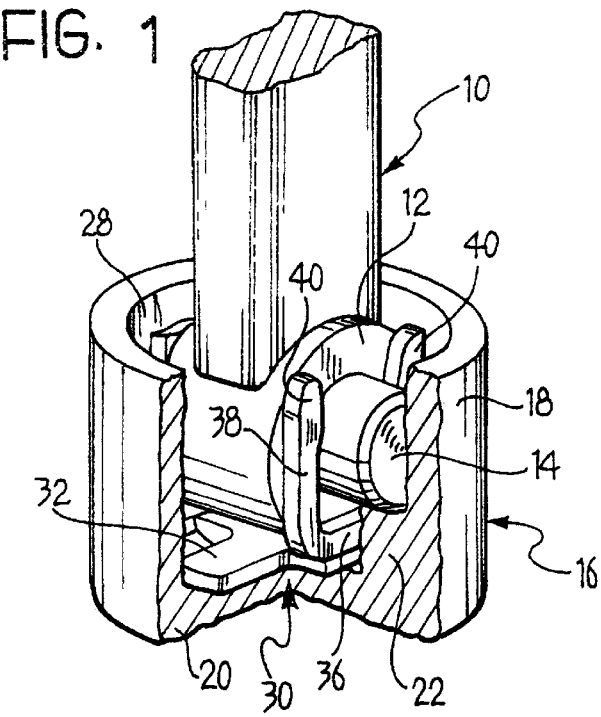
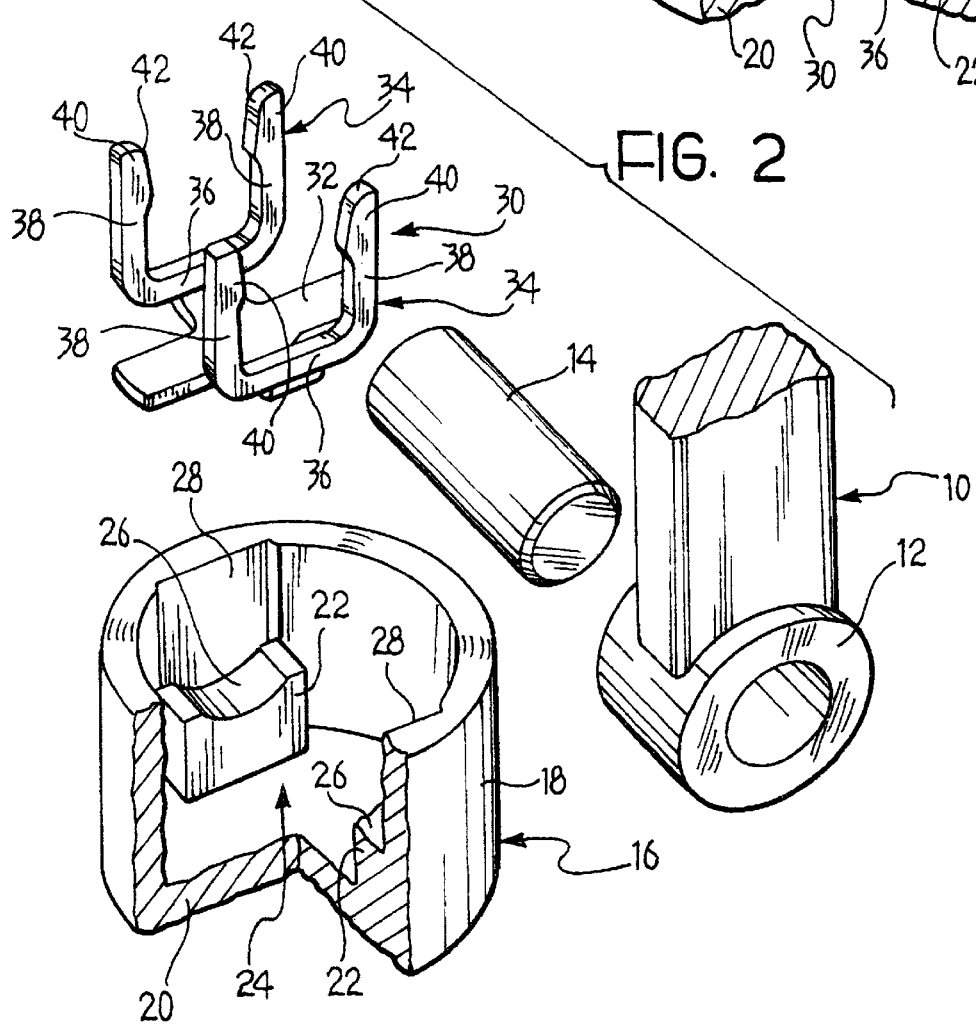

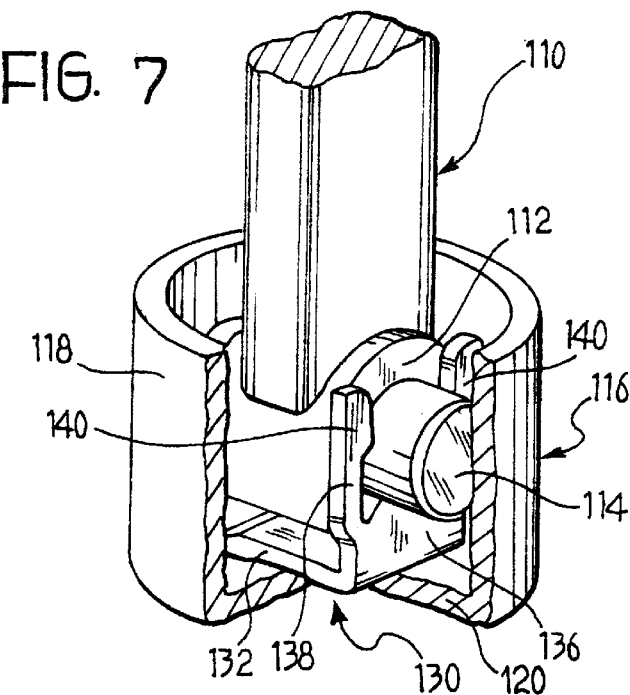
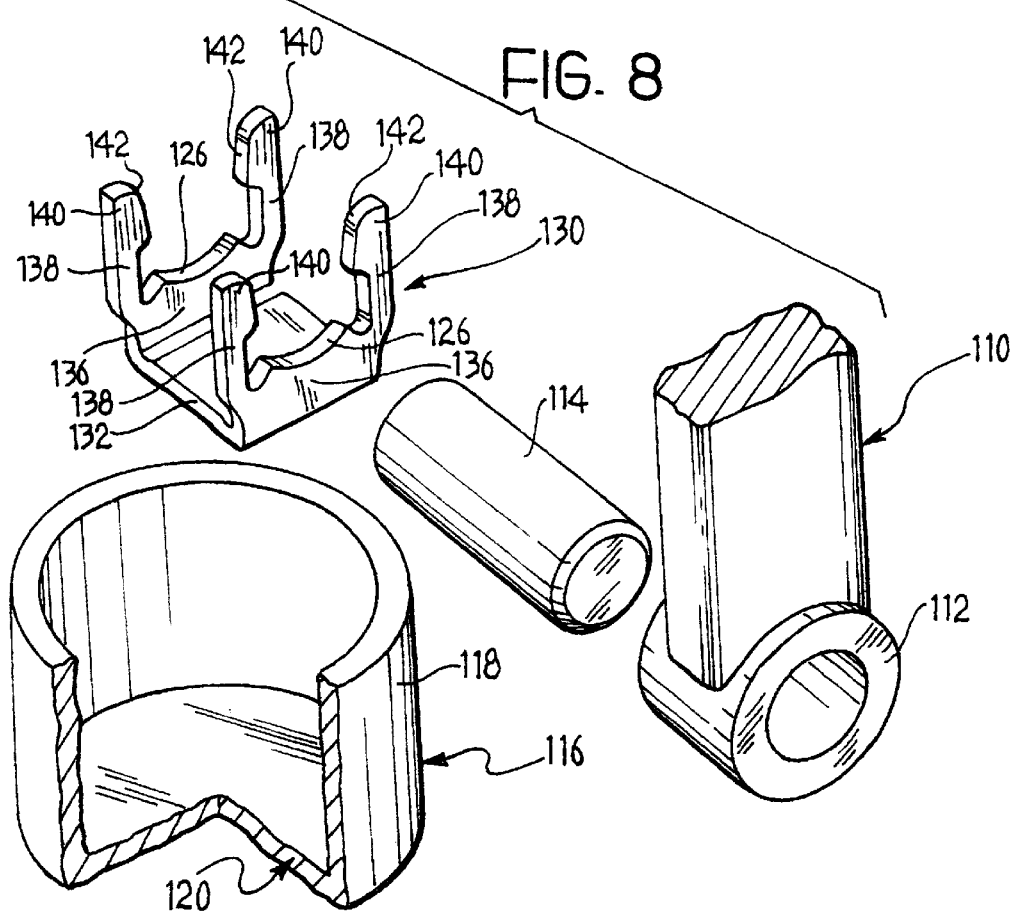

CONNECTING-ROD/PISTON UNIT FOR SMALL RECIPROCATING MACHINES AND A MOTOR-DRIVEN COMPRESSOR OR A SIMILAR RECIPROCATING MACHINE COMPRISING THE UNIT

The present invention relates to a connecting-rod/piston unit for small reciprocating machines, particularly motor-driven compressors for refrigerators and the like, Units of this type are known from the documents FR-A-2 330 923 and EP-A-0 608 506.

According to the document FR-A-2 330 923, the piston has a pair of diametrally-opposed internal projections which in turn have respective recesses aligned with one another and constituting a bearing seat for the gudgeon pin.

In one embodiment, the sides of the recesses have cold-formed local deformations which hold the gudgeon pin permanently in its bearing seat; in another embodiment, the sides of the recesses and the gudgeon pin are interconnected permanently by electric spot welds called "wart-shaped projections".

The methods of fixing the gudgeon pin to the piston according to the document FR-A-2 330 932 require either a suitable press for performing the local deformations, or a suitable electric welding station for executing the spot welds.

These methods are not suitable for the assembly of motor-driven compressors or small reciprocating machines of other types on a continuous line because, in order to fix the gudgeon pin to the piston, they require a press or a welding machine separate from the line.

This problem was at least partly solved by the teachings of the document EP-A-0 608 506.

According to this document, the piston of a motor-driven compressor unit again has a pair of diametrally-opposed internal projections which in turn have respective recesses aligned with one another and constituting a bearing seat for the gudgeon pin.

The retaining means in this case consist of a spring ring surrounding the shank of the connecting rod and having anchoring tabs projecting from its periphery.

In the assembled condition, the retaining ring reacts against the gudgeon pin and keeps it engaged in its seat by virtue of the fact that the tabs of the ring bite into the internal surface of the skirt of the piston, thus achieving a firm anchorage between the ring and the piston by interference.

This arrangement known from the document EP-A-0 608 506 permits a simplified, relatively low-cost assembling operation.

A person responsible for quality control downstream of the assembly station may notice that some part (for example, the connecting rod) is faulty. In this case, the sub-assembly can easily be dismantled by pulling the piston away from the connecting rod and its retaining ring in order to recover the piston and the gudgeon pin.

However, this operation may irreparably damage the piston since, when the spring ring is removed, its tabs which bite into the surface of the skirt may scratch the latter, which is detrimental to the possibility of re-using the piston.

The solution of the document EP-A-0 608 506 also has the disadvantage of requiring the use of pistons which have quite thick skirts and are therefore undesirably heavy; in fact, it has been found that the tabs of the retaining ring deform a fairly thin skirt, causing it to lose its cylindrical shape. For example, in the case of a retaining ring with four tabs, the skirt adopts a four-leafed shape.

The object of the invention is to provide a connecting-rod/piston unit which can be assembled in the manner permitted by the solution of the document EP-A-0 608 506 but which is not liable to deform a thin skirt and which allows a faulty connecting-rod/piston unit to be dismantled easily, for example, in order to recover the piston and the gudgeon pin therefrom without damaging the skirt.

According to the invention, this object is achieved by means of a connecting-rod/piston unit having the characteristics claimed.

The invention is based on the observation that, in a small reciprocating machine such as a motor-driven compressor for refrigerators, the forces acting between the piston and the connecting rod during intake strokes are so weak as to require neither permanent fixing of the gudgeon pin to the piston as in the document FR-A-2 330 923, nor an anchorage which is releasable but may damage the piston, as in the document EP-A 0 608 506.

As will be understood further from the description relating to the drawings, the snap-coupling of the pincer element according to the invention with the gudgeon pin is all that is required to withstand the relatively weak forces which arise during intake strokes but enables the gudgeon pin to be removed from the piston easily as a result of a simple resilient opening-out of the jaws of the pincer element which grasp the gudgeon pin.

The invention also relates to a motor-driven compressor or a similar reciprocating machine comprising a connecting-rod/piston unit as claimed.

Figure 4:
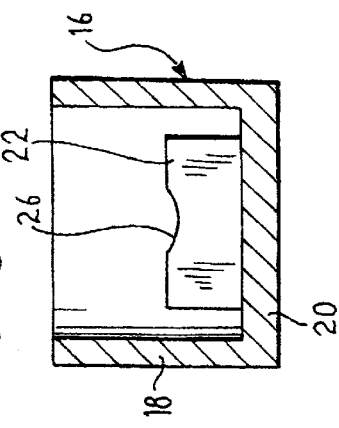
Figure 5:
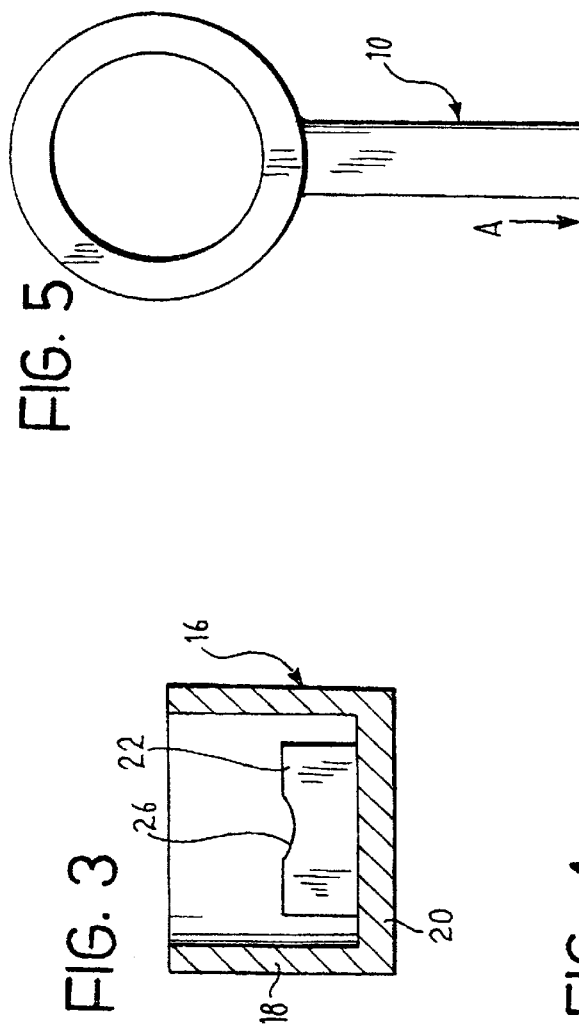
Figure 6:
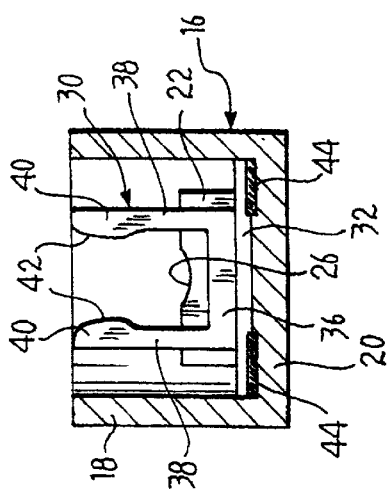
Figure 12:
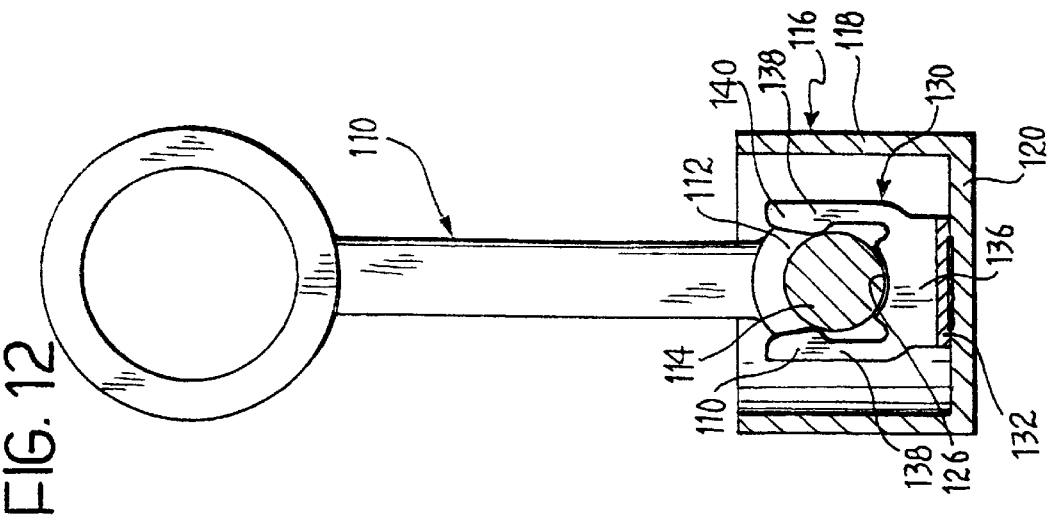
Figure 11:
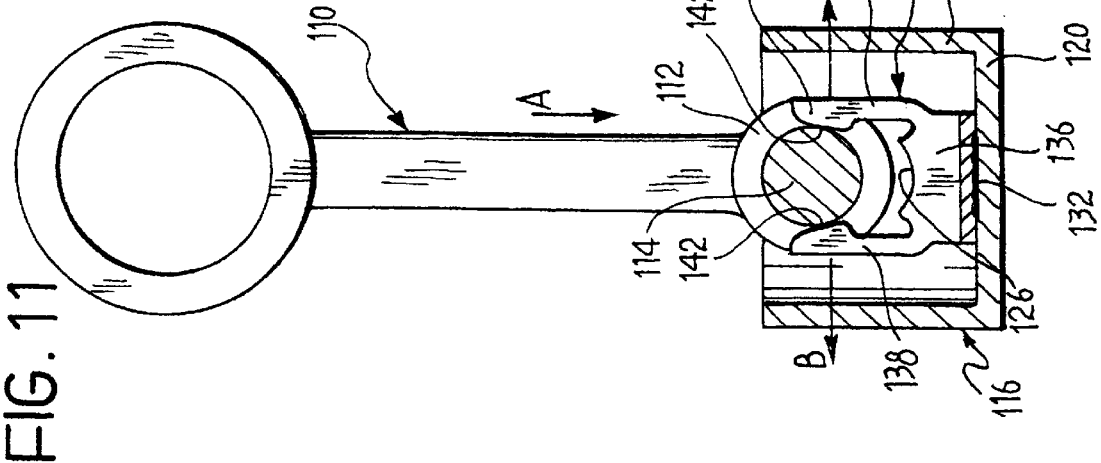
Figure 9:
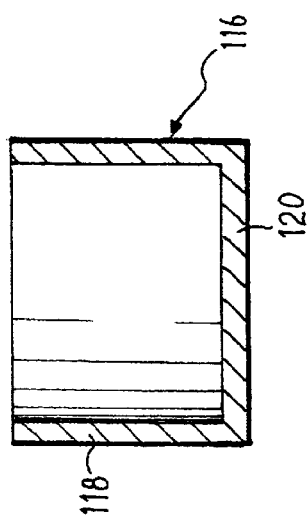
Figure 10:
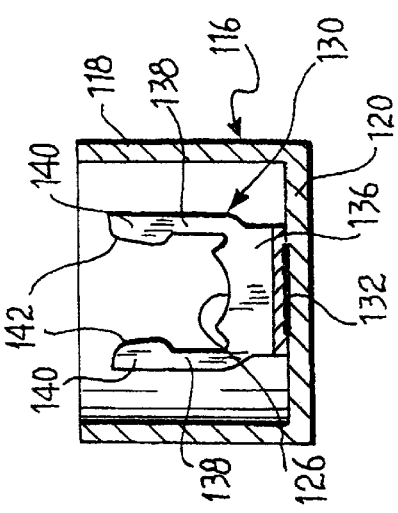

The invention will be understood further from a reading of the following detailed description given with reference to the appended drawings, provided by way of non-limiting example, in which:

FIG. 1 is a partially cut-away, partial perspective view of a connecting-rod/piston unit according to a first embodiment of the invention, FIG. 2 is a partially-exploded and partially cut-away perspective view of the unit of FIG. 1, FIG. 3 shows the piston of the unit of FIGS. 1 and 2 alone and in diametral section, FIG. 4 is a diametral section similar to FIG. 3 showing the piston of FIG. 3 in which a pincer element has been fixed, FIG. 5 is a partially-sectioned elevational view showing a connecting rod the gudgeon pin of which is on the point of being engaged by the pincer element of FIG. 4, FIG. 6 is a view similar to FIG. 5 with the gudgeon pin fully engaged in the pincer element, FIG. 7 is a partially cut-away, partial perspective view of a connecting-rod/piston unit according to another embodiment of the invention, FIG. 8 is a partially exploded and partially cut-away view of the unit of FIG. 7, FIG. 9 shows the piston of the unit of FIGS. 7 and 8 alone and in diametral section, FIG. 10 is a diametral section similar to FIG. 9 showing the piston of FIG. 9 in which a pincer element has been fixed, FIG. 11 is a partially-sectioned elevational view showing a connecting rod the gudgeon pin of which is on the point of being engaged by the pincer element of FIG. 10, and FIG. 12 is a view similar to FIG. 11 with the gudgeon pin fully engaged in the pincer element.

With reference to FIGS. 1 to 6, a connecting rod shown as a whole in FIGS. 5 and 6, is indicated 10.

The connecting rod 10 comprises a small end 12 in the form of an eye in which a gudgeon pin 14 is fitted.

A piston associated with the connecting rod 10 is generally indicated 16.

The piston 16, which may be constituted by a die-cast or sintered light-alloy part, comprises a cylindrical skirt 18 and an end wall 20 corresponding to the crown of the piston.

In the embodiment of FIGS. 1 to 6, a bearing seat for the gudgeon pin similar to that of the document FR-A-2 330 922, is formed integrally in the piston.

In particular, the piston 16 has a pair of diametrally-opposed internal projections 22. The projections 22 are separated by a central cavity 24 (FIG. 2) for housing the small end 12 of the connecting rod 10.

The two projections 22 have respective recesses 26 aligned with one another and shaped like segments of cylinders.

The recesses 26 constitute the bearing seat for the gudgeon pin 14 in the piston 16.

The relatively large forces which act between the connecting rod 10 and the piston 16 during the compression stroke, in the case of a compressor, and during the compression and expansion strokes in the case of an engine, are transmitted by the contacting cylindrical surfaces of the gudgeon pin 14 and of the recesses 26.

The skirt 18 of the piston 16 has diametrally-opposed grooves 28 (FIGS. 1 and 2) the bases of which cooperate with clearance with the ends of the gudgeon pin 14 in order to restrain the gudgeon pin laterally.

Retaining means are provided for keeping the gudgeon pin 14 bearing in its seat constituted by the recesses 26 and, according to the invention, comprise a pincer element.

The pincer element, generally indicated 30, of the embodiment of FIGS. 1 to 6, will now be described with reference, in particular, to FIG. 2.

The pincer element 30 is constituted by a single piece of blanked and bent sheet metal composed of a metal having resilient properties such as, for example, a special or stainless steel.

The pincer element 30 comprises a plate-like base portion 32 and a pair of pincer portions 34 disposed on two opposite sides of the base portion 32.

Each of the pincer portions 34 comprises a respective yoke 36 adjacent the base portion and a pair of resilient jaws 38.

Each of the resilient jaws 38 has, in the region of its free end, a respective snap-coupling tooth 40 projecting towards the other tooth 40.

Each of the teeth 40 has a lead-in surface 42. The lead-in surfaces 42 of each pincer portion 34 are arranged so as to constitute a diverging opening for the purpose which will be explained further below.

In the assembled condition, the pincer element 30 is welded or glued to the end wall 20 of the piston 16.

The thick lines 44 in FIGS. 4, 5 and 6 represent, without distinction, regions in which the plate-like portion 42 is welded or glued to the end wall 20.

When welding is used, this can advantageously be carried out by the capacitive discharge process.

FIG. 3 shows the piston 16 before assembly and without the pincer element 30.

In FIG. 4, the pincer element 30 has been welded or glued to the end wall 20 in the regions 44.

In order to continue with the assembly of the connecting-rod/piston unit with the pincer element 30 fixed to the piston 16 as in FIG. 4, the connecting rod 10 is brought up to the piston 16 as in FIG. 5, the gudgeon pin 14 being applied to the chamfered surfaces 42 of the jaws 38.

It then suffices to exert a force or pressure on the connecting rod 10 in the direction of the arrow A of FIG. 5 in order to open out the jaws 38 in accordance with the arrows B, inserting the gudgeon pin 14 between the jaws until the final position of FIG. 6 is reached.

In the position of FIG. 6, the gudgeon pin 14 has come to rest in the seat constituted by the recesses 26, and the jaws 38 have withdrawn towards one another, thus holding the gudgeon pin 14 in the pincer element 30 with snap-coupling.

The jaws 38 and their teeth 40 are of a size and configuration such that the forces exerted between the connecting rod 10 and the piston 16 during the intake stroke are not sufficient to open out the jaws 36 in the directions of the arrows B (FIG. 5), but this resilient opening-out is still possible in order to release the gudgeon pin 14 from the pincer element 30 by manual force or with a tool in order to detach the connecting rod 10 from the piston 16.

Reference will now be made to FIGS. 7 to 12 in order to describe a second embodiment of the invention.

In FIGS. 7 to 12, parts identical or equivalent to those of FIGS. 1 to 6 are indicated by the same reference numerals increased by 100.

In the embodiment of FIGS. 7 to 12, the connecting rod is indicated 110, its small end is indicated 112 and the gudgeon pin is indicated 114.

A piston associated with the connecting rod 110 is generally indicated 116.

The piston 116, which again may be constituted by a die-cast or sintered light alloy part or even by a deep-drawn metal part, has a simple cup-shape with a cylindrical skirt 118 and an end wall 120.

A pincer element generally indicated 130 is fixed in the piston 110 and will now be described with particular reference to FIG. 8.

In the embodiment of FIGS. 7 to 12, the pincer element 130 is again constituted by a single piece of blanked and bent sheet metal composed of a metal having resilient properties such as, for example, a special or stainless steel.

The pincer element 130 comprises a plate-like base portion 132 and a pair of pincer portions 134 disposed on two opposite sides of the base portion 132.

Each of the pincer portions 134 comprises a respective yoke 136 adjacent the base portion and a pair of resilient jaws 138.

Each of the yokes 136 has, inside the pincer portion 134, a respective concave arcuate edge 126 in the shape of a segment of a cylinder, constituting a bearing seat for the gudgeon pin 114 in the piston 116, instead of the recesses 26 of the embodiment of FIGS. 1 to 6.

Each of the resilient jaws 138 has, in the region of its free end, a respective snap-coupling tooth 140 projecting towards the other tooth 140.

Each of the teeth 140 has a lead-in surface 142. The lead-in surfaces 142 of each pincer portion 134 are arranged so as to constitute a diverging opening as in the embodiment of FIGS. 1 to 6.

In the assembled condition, the pincer element 130 is welded or glued to the end wall 120 of the piston 116.

A thick line 144 in FIGS. 10, 11 and 12 represents, without distinction, a region in which the plate-like portion 142 is welded or glued to the end wall 120.

When welding is used, it may also advantageously be carried out by the capacitive discharge process in this embodiment.

FIG. 9 shows the piston 116 before assembly and without the pincer element 130.

In FIG. 10, the pincer element 130 has been welded or glued to the end wall 120 in the region 144.

In order to continue with the assembly of the connecting-rod/piston unit with the pincer element 130 fixed to the piston 116 as in FIG. 10, the connecting rod 110 is brought up to the piston 116 as in FIG. 11, the gudgeon pin 114 being applied to the chamfered surfaces 142 of the jaws 138.

In this embodiment again, it then suffices to exert a force or pressure on the connecting rod 110 in the direction of the arrow A of FIG. 11 in order to open out the jaws 138 in the directions of the arrows B, inserting the gudgeon pin 114 between the jaws until the final position of FIG. 12 is reached.

In the position of FIG. 12, the gudgeon pin 114 has come to rest in the seat constituted by the concave arcuate edges 126 of the yokes 136 and the jaws 138 have withdrawn towards one another, thus holding the gudgeon pin 114 in the pincer element 130 with a snap-coupling.

Again in this second embodiment, the jaws 138 and their teeth 140 are of a size and configuration such that the forces exerted between the connecting rod 110 and the piston 116 during the intake stroke are not sufficient to open out the jaws 136 in the directions of the arrows B (FIG. 11), but this resilient opening-out is still possible in order to release the gudgeon pin 114 from the pincer element 130 by manual force or with a tool in order to detach the connecting rod 110 from the piston 116.

What is claimed is:

1. A connecting-rod/piston unit for reciprocating machines, such as motor-driven compressors for refrigerators, in which the connecting rod (10; 110) has a gudgeon pin (14; 114) and in which the piston (16; 116) has an end wall (20; 120) corresponding to the crown of the piston, in which a bearing seat (26; 126) is provided in the piston (16; 116) for the gudgeon pin (14; 114), and in which means (30; 130) are provided for retaining the gudgeon pin (14; 114) bearing in its seat (26; 126), characterized in that the retaining means comprise a pincer element (30; 130) with a base portion (32; 132) fixed to the said end wall (20; 120) and with a pair of pincer portions (34; 134) arranged on either side of the small end (12; 112) of the connecting rod and each having a yoke (36; 136) and a pair of resilient jaws (38; 138) shaped so as to grasp the gudgeon pin (14; 114) and retain it in the seat (26; 126) with a snap-coupling.

2. A connecting-rod/piston unit according to claim 1, characterized in that the piston (16) has a pair of diametrally-opposed internal projections (22) which are separated by a central cavity (24) for housing the small end (12) of the connecting rod (10) and which have respective recesses (26) aligned with one another and constituting the bearing seat (26).

3. A connecting-rod/piston unit according to claim 1, characterized in that the said bearing seat is constituted by concave arcuate edges (126) of the yokes (136) of the two pincer portions (134) of the pincer element (130).

4. A connecting-rod/piston unit according to claim 1, characterized in that the pincer element (30; 130) is formed from a single piece of blanked and bent sheet metal composed of a metal having resilient properties.

5. A connecting-rod/piston unit according to claim 1, characterized in that the base portion (32; 132) of the pincer element (30; 130) is fixed to the end wall (20; 120) by welding (44; 144).

6. A connecting-rod-piston unit according to claim 1, characterized in that the base portion (32; 132) of the pincer element (30; 130) is fixed to the end wall by gluing (44; 144).

* * * * *